United States Patent [19]
Yamaguchi et al.

[11] 3,791,493
[45] Feb. 12, 1974

[54] FRICTION ELEMENTS FOR BRAKING ROTARY BODIES

[75] Inventors: Motosaburo Yamaguchi; Matsuo Takahashi, both of Yokohama, Japan

[73] Assignee: Nippon Carbon Company, Limited, Tokyo, Japan

[22] Filed: Nov. 29, 1971

[21] Appl. No.: 202,857

[30] Foreign Application Priority Data
Dec. 5, 1970  Japan.............................. 45-107190
Dec. 25, 1970  Japan.............................. 45-118141

[52] U.S. Cl............................ 188/251 M, 192/107 M
[51] Int. Cl............................................ F16d 69/02
[58] Field of Search... 188/251 M, 73.1; 192/107 M

[56] References Cited
UNITED STATES PATENTS

| | | | |
|---|---|---|---|
| 3,478,849 | 11/1969 | Hahm........................ | 188/251 M X |
| 3,092,214 | 6/1963 | Batchelor et al........... | 188/251 M X |
| 3,318,423 | 5/1967 | Dunki............................. | 188/251 M |
| 3,003,588 | 10/1961 | Huntress..................... | 188/251 M X |
| 3,306,401 | 2/1971 | Dasse............................ | 188/251 M |
| 3,371,756 | 3/1968 | Spitz............................. | 188/251 M |
| 761,384 | 5/1904 | Lambert........................ | 188/251 M |

*Primary Examiner*—Allen N. Knowles
*Assistant Examiner*—Gene A. Church
*Attorney, Agent, or Firm*—Stevens, Davis, Miller & Mosher

[57] ABSTRACT

Friction elements for braking rotary bodies, such as wheels in railway cars, electric cars and motorcars, contains 50 – 100% by weight of aluminum and said elements may be aluminum alloys or aluminum compositions. These elements may be used alone by directly sliding on a wheel or together with a conventional brake, or for a brake shoe in a disc brake.

10 Claims, 7 Drawing Figures

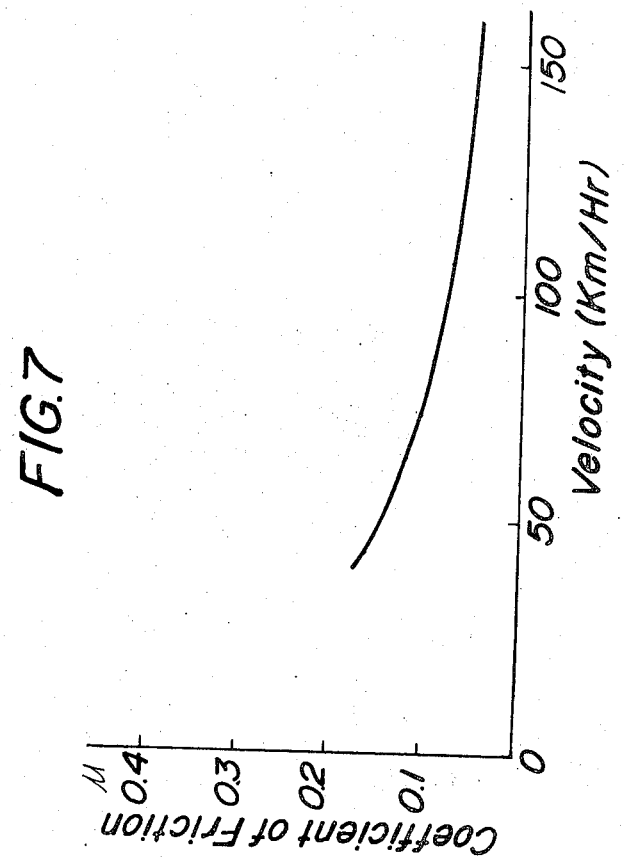

FRICTION ELEMENTS FOR BRAKING ROTARY BODIES

The present invention relates to novel friction elements and particularly to friction elements composed of aluminum-containing alloy or composition.

The object of the present invention is to provide friction elements by which a brake can be satisfactorily operated even upon driving in a high speed and an excellent braking function can be obtained when using in the presence of water, for example, under raining or in water.

As the friction elements, cast iron, copper series sintered alloy, resin mold and the like have been known but they have some drawbacks and have not been fully satisfied. Particularly, the brake working has recently become very severe in the condition but the friction elements fit for such condition have never been developed. For example, the velocity of cars has become higher, so that the requirements in the brake working are severe and the brake must be operated securely under raining or in water but materials satisfying these requirements have never been obtained.

For example, various brakes have been used in order to decrease or control the speed of rotary portions of machines, installations and the like and among them a friction brake which utilizes the frictional force generating at contacting portion between solids, has been most used. The velocity of wheels in railway cars or electric cars is controlled by the frictional force generated by contacting the side face of discs engaging with the wheels with a brake.

However, this brake is made of materials mainly selected in view of the frictional properties and can develop the frictional force fully in fine weather but lowers the frictional force under a wet condition. Accordingly, in the case of rolling stocks, such as railway cars and electric cars which need a high frictional force either in the fine weather or in raining, the decrease of the frictional force is an important problem.

Furthermore, recently the rotary portions in machines get a high speed and particularly the rolling stocks and motorcars in a high speed require the control of speed under the most severe conditions and friction elements satisfying these reqirements have been demanded.

In the relation of the wheel velocity to the coefficient of friction in the well known brake, the coefficient of friction lowers under a wet condition and at a higher speed. Therefore, in the recent high speed cars, the brake pressure is controlled with reference to some degree of experience or known data considering the variation of weather, whereby the velocity is controlled. Furthermore, in motorcars, the brake mechanism itself is housed in a casing and therefore the braking is not influenced by weather as in the rolling stocks, but in the raining, water enters into the casing and in winter the brake becomes wet due to frost and the same problem as in the rolling stocks occurs and the control of speed depends upon the technic of the driver resulting into an accident in raining.

In the rolling stocks in running on rails, a frictional force is generated between the wheels and the rails and this causes attracting force and the running is made and a braking force is generated and a stopping is effected. Namely, the rotating force of wheels is applied on the rails by the frictional force between the wheels and the rails and then the reaction force is subjected to the wheels and the rolling stock is accelerated and runs, while when a force for stopping the rotation of wheels is applied, the stopping force is applied on the rails by the above described frictional force and the reaction force is applied to the wheels and the velocity of the rollling stock is decreased. However in the above described frictional force there is a limitation and when a too large braking force is applied to the wheels, they slip and the frictional force causing the slip is referred to as "critical frictional force." A variety of investigations have been made with respect to the critical frictional force. For example, the critical frictional force mainly depends upon the physical properties between the rails and the wheels and as this value the coefficient of friction must be at least 0.15. When the coefficient of friction is less than 0.15, the slip occurs, and even if the braking is applied, the speed of the rolling stock cannot be controlled and the slip brings about the damage of wheels and rails.

It was determined with respect to the real railway cars whether the above described relation (at least 0.15 of coefficient of friction) is maintained or not and the result as shown in FIG. 1 was obtained. FIG. 1 is a graph for showing the variation of the coefficient of friction at various velocities of a rolling stock, when the condition of rails varies. As seen from FIG. 1, as the speed increases, the coefficient of friction decreases and when the rails are under a wet condition, the coefficient of friction lowers and for example when the speed exceeds about 70 Km/hr, the coefficient of friction lowers to less than 0.15. However, recently the speed of rolling stocks is higher and in many cases the speed exceeds 70 Km/hr, and the prevention of slip of wheels in the driving under wet condition (in raining), particularly in the control of speed by means of a brake has been an important problem.

The present invention is to provide novel friction elements by which these previous drawbacks are obviated. Namely, the friction elements of the present invention are excellent in the braking in a high speed driving and show a noticeable function in the braking in the presence of water.

The friction elements of the present invention are applied for the following uses.

1. The brake for stopping the wheels is composed of the friction element of the present invention, which comes into a direct contact with the wheels.
2. The conventional brake and the friction element of the present invention are used together to improve the friction between the rails and the wheels.
3. The friction element is used as a brake shoe and is provided on a disc brake.

When the friction element according to the present invention is used as a brake shoe in the above described item (3), the brake shoe may be constituted with the friction element of the present invention alone or with both the friction element and a conventional brake shoe, for example, composed of copper series sintered alloy. In this case, the friction element of the present invention and the conventional brake shoe may be arranged either in adjacent relation or in a space.

The inventors have found that a material having at least 50% by weight of aluminum shows excellent properties as such friction element.

Namely, the friction elements of the present invention are as follows:

100% aluminum.

Aluminum alloy containing at least 50% by weight of aluminum.

Aluminum composition containing at least 50% by weight of aluminum.

The friction elements may be shaped articles (compression, casting and the like), sintered alloys or powders.

An explanation will be made with respect to the friction mechanism of the friction elements of the present invention hereinafter.

Aluminum constituting the friction element easily forms hydroxide due to water and when this hydroxide is subjected to a contact friction between solids, the hydroxide is easily peeled and fallen off from the friction element and a part of peeled hydroxide deposits on a partner contacting with the friction element.

For example, when the friction element according to the present invention is used as a brake shoe in a disc brake, hydroxide formed on the brake shoe due to water peels off and deposits on the brake disc and this hydroxide is further exposed to water, so that the surface is stabilized and the hydroxide forms rigid projections. When such rigid projections are formed on the surface of the partner to be contacted with the friction element, the water film formed between the brake disc and the brake shoe is broken and the friction brake acts as under the dry condition and the coefficient of friction in the high speed is stabilized by the presence of the projections. Such a function also can be obtained when the friction element of the present invention is used as a brake shoe together with a conventional brake shoe.

When the brake for stopping the wheels is composed of the friction element of the present invention and this brake is directly contacted and slidden with the wheels to control the velocity, aluminum constituting the friction element forms also hydroxide due to water as described above. The hydroxide is apt to be bonded to the wheel composed of iron, and aluminum hydroxide deposited on the wheel has a ductility and therefore is easily transformed by the compression force of the brake against the wheel or the compression force between the wheel and the rail and the depositing area increases. Aluminum hydroxide deposited on the wheel surface is put in water successively under a wet condition, so that the hydroxide on the surface is further stabilized and becomes rigid and forms projections. When the projections are formed on the wheel surface, the water film to be formed between the wheel and the rail is broken and the wheel contacts with the rail through the above described projections formed on the wheel. Accordingly, when the projections are increased, the solid contacting area increases and consequently the frictional force is improved. However, the deposited projections do not parmanently remain on the wheel surface and are worn away in the powder form and fallen gradually, while the hydroxide is always supplemented to the wheel from the friction element and the stable frictional force may be maintained.

Moreover, in the case of braking the wheels, if a conventional brake is used and further the friction element of the present invention is compressed against the wheels, a part of hydroxide formed due to water as described above deposits on the wheels and forms the projections, which break the water film between the wheel and the rail and the water film between the wheel and the brake and therefore the wheel and the brake or the wheel and the rail contact with each other through the aluminum hydroxide projections and the frictional force is further improved.

On the contrary, in a conventional system a water film is formed between the sliding members and a kind of liquid lubrication is formed and the coefficient of friction lowers.

However, according to the present invention aluminum constituting the friction element forms aluminum hydroxide and the hydroxide is apt to bond to a partner contacting with the friction element, which is composed of iron, and further has a high ductility, so that after deposited on the partner, the depositing area extends and consequently the coefficient of friction increases.

When the friction element contains at least 50% by weight of aluminum and has a certain degree of mechanical strength, the object of the present invention can be attained. The shaping process of the friction element composed of aluminum alloy may be any one of casting and sintering means, In addition, the friction element may be formed by molding a mixture of powdery aluminum or aluminum alloy with carbon, asbestos, silica, alumina, iron oxide or sand together with a binder of thermosetting synthetic resins, such as phenolic resin, furan resin, polyester resin, polydivinylbenzene resin and the like. When the molding is effected by using such a binder, any shape may be easily formed.

In carrying out the present invention, the friction element may be used not only in the shaped articles but also in the form of granule or powder, which is supplyed to friction portions between a brake or a rail and a wheel.

As mentioned above, aluminum in the friction element has the excellent braking function. When the friction element requires a high strength and a certain degree of abrasion resistance, aluminum is added with copper and silicon and, if necessary at least one of elements selected from the group consisting of magnesium, nickel, chromium, iron, lead and boron nitride is added thereto. When these elements are added to aluminum, they form a variety of compounds between aluminum (for example, intermetallic compounds). These compounds include eutectic type, solid solution type, eduction hardening type and the like. In the alloys containing at least 50% by weight of aluminum, the friction mechanism is maintained as described above under a high speed and wet condition.

The inventors have investigated with respect to the proper composition in the aluminum alloy, the elements to be added and the addition range thereof and found that when said alloy contains 50–85% by weight of Al, 0.1–25% by weight of Si and 0.1–10% by weight of Cu and further, if necessary contains less than 10% by weight of at least one element selected from the group consisting of Mg, Ni, Cr, Ir, Pb and BN, the friction element having the following properties can be obtained.

1. Even when said friction element is used for a rolling stock having a velocity of 100 Km/hr in raining, the coefficient of friction is maintained at more than 0.15.
2. The worn amount of the friction element is about 10 mm in the maximum value per 10,000 Km of running distance of the rolling stock.

3. The mechanical strength of the friction element is more than 3,000 Kg/cm² in the bending strength.
4. Both the sintered alloy and the casted alloy provide the same effect.

The above described worn amount was determined as follows:

The friction element was contacted with a rotating wheel and the running distance was calculated from the velocity of rotation of the wheel and the worn thickness of the friction element in this case was measured. For the reference, the worn amount of a conventional friction element made of cast iron is 20 mm/10,000 Km and the mechanical strength (bending strength) is 3,000 Kg/cm² on the average.

The reason of the above limitation of the composition will be explained hereinafter.

Aluminum is added in order to increase the frictional force and therefore it is preferred that the amount of aluminum is larger. However, when the amount of aluminum is larger, the worn amount increases, so that the upper limit is 85% by weight, when the aluminum alloy is used as a brake. Even when the amount of aluminum is 50% by weight, the desired effect for improving the frictional force can be attained.

However, recently the speed of the rolling stocks is very high and it is required to run the rolling stocks at a velocity of more than 120 Km/hr or more than 200 Km/hr, and in some cases it is required to stop the car suddenly when the rolling stock is running at a velocity of more than 200 Km/hr, and in order that such a rolling stock can be stopped in a short braking distance, the lower limit of aluminum must be about 65% by weight.

Silicon mainly serves to improve the abrasion resistance and the amount is preferred to be 0.1–25% by weight. Copper mainly serves to improve the mechanical strength and simultaneously improves the abrasion resistance to some extent and the amount is preferred to be 0.1–10% by weight.

The other magnesium, nickel, chromium, iron, lead and boron nitride serve to increase the mechanical strength and the abrasion resistance and when the content is at most 10% by weight, the mechanical strength and the abrasion resistance can be improved without deteriorating the frictional force.

The invention will now be explained with reference to the accompanying drawings, in which:

FIGS. 6 and 7 are graphs for showing relations of the coefficient of friction to the velocity of rotation of a wheel when using the friction element respectively.

The following examples are given for the purpose of illustration of this invention and are not intended as limitations thereof.

Example 1

Figure 1:
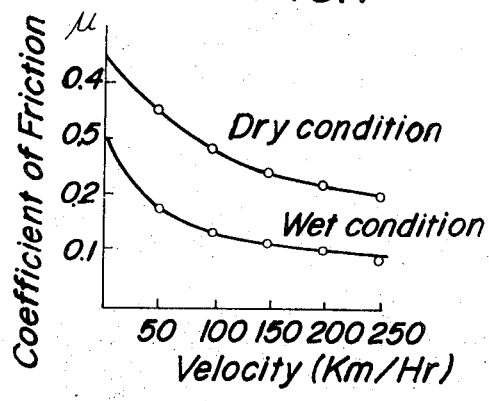
FIG. 1 is a graph for showing a relation of the coefficient of friction between a wheel and a rail to the velocity of a rolling stock under a dry condition and a wet condition.
Figure 2:
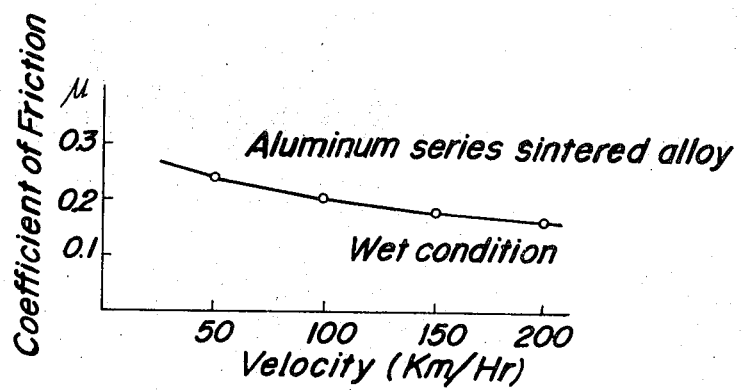
FIG. 2 is a graph for showing a relation of the coefficient of friction to the velocity of a rolling stock when aluminum sintered alloy according to the present invention is used as a friction element under a wet condition.

77% by weight of powdery aluminum, 4.5% by weight of powdery copper, 11% by weight of powdery silicon, 0.5% by weight of powdery chromium, 2% by weight of powdery nickel, 0.5% by weight of magnesium and 4.5% by weight of lead were mixed and the mixture was sintered to form a friction element. This friction element and a brake were provided on a wheel and the wheel was rotated. The revolution number was set so that the velocity was 0–200 Km/hr. During the test, water was always supplied between the wheel and the rail by a hose to maintain the wet condition and the relation between the velocity of the wheel and the coefficient of friction when a brake was applied on the wheel, was determined to obtain the result as shown in FIG. 2. From FIG. 2 it can be seen that when the friction element of the present invention is used, the variation of the coefficient of friction is much smaller than the conventional case as shown in FIG. 1 and even in the velocity of more than 120 Km/hr, the coefficient of friction was maintained at more than 0.18.

Example 2

A brake of the present invention obtained by casting 1% by weight of copper, 12% by weight of silicon, 1% by weight of magnesium, 0.5% by weight of iron, 1.5% by weight of nickel and the balance of aluminum and a conventional brake composed of copper series cast alloy were manufactured and a relation between a velocity and a coefficient of friction under a wet condition was determined.

Figure 3:
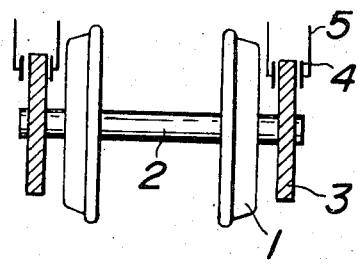
FIG. 3 is a front view of an embodiment of a disc brake.

In this test, the brake was constituted as a disc brake as shown in FIG. 3. Referring to FIG. 3, 1 is a wheel, 2 is a shaft, 3 is a disc, 4 is a brake shoe and 5 is a working mechanism of the brake. In the brake shoe 4, a brake shoe 4a composed of the conventional copper series sintered alloy and a brake shoe 4b composed of the above described aluminum casted alloy were arranged contiguously.

In the conventional brake, the brake shoe 4 was constituted with the copper series sintered alloy.

Figure 5:
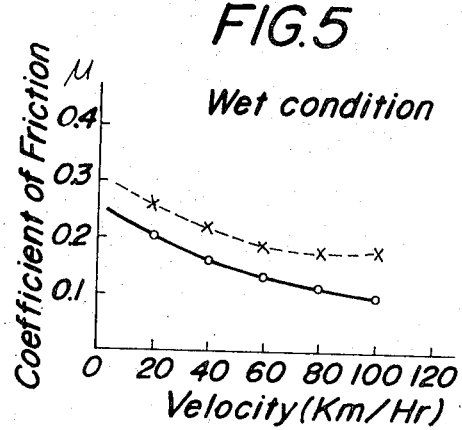
FIG. 5 is a graph for showing a relation of the coefficient of friction to the velocity of a rolling stock when using the brake shoe as shown in FIG. 4.
Figure 6:
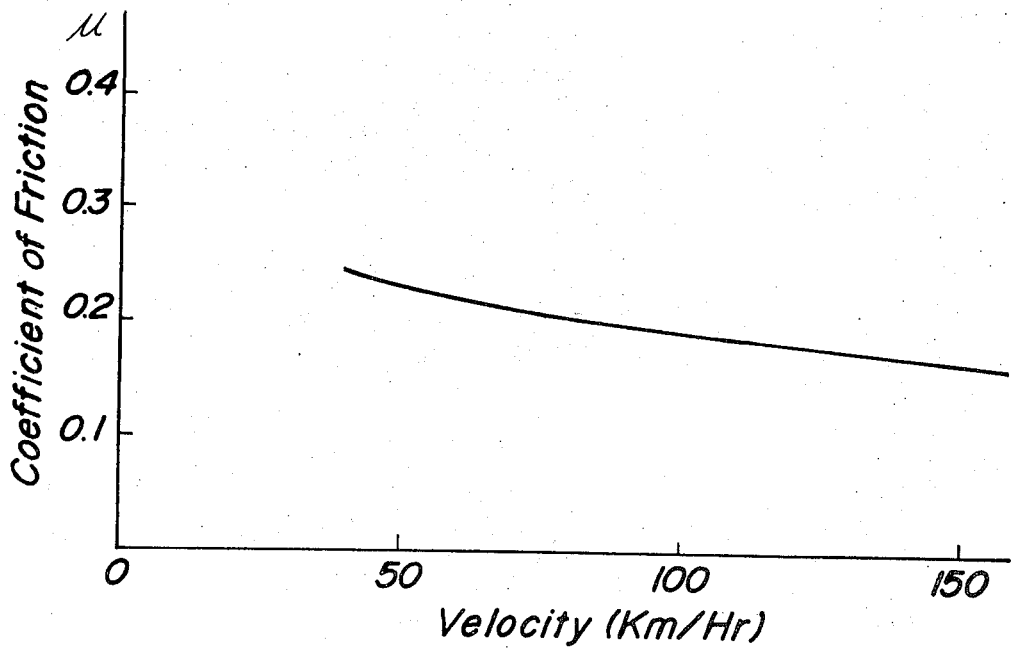

With respect to both the brakes the friction test was made under a wet condition and the result as shown in FIG. 6 was obtained. In FIG. 5, the solid line shows the data on the conventional brake and the broken line shows the data on the brake of the present invention.

As seen from FIG. 5, in the conventional brake, as the velocity increases, the coefficient of friction lowers and particularly when the velocity is more than 60 Km/hr, the decreasing ratio becomes constant and such a brake is not suitable for a high speed rolling stock.

On the contrary, even in the brake of the present invention, the coefficient of friction decreases as the velocity increases but the decreasing ratio is rather small as the velocity increases and particularly when the velocity becomes more than 80 Km/hr, the coefficient of friction does not substantially decrease. As seen from FIG. 5, the coefficient of friction of the brake of the present invention is maintained at more than 0.18 under a wet condition.

Example 3

Figure 4:
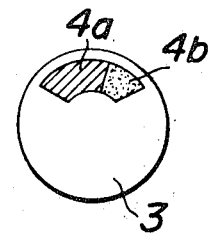
FIG. 4 is a side view of the disc brake in FIG. 3 on which a brake shoe constituted with the friction element of the present invention and a brake shoe constituted with a conventional copper series sintered alloy are arranged.

80% by weight of aluminum and the balance of Al$_2$O$_3$, SiO$_2$, Fe$_2$O$_3$ and powdery asbestos were mixed and the mixture was press molded by adding phenolic resin to form a brake shoe as shown in FIG. 4. The resulting brake shoe was tested under the same condition as described in Example 2 and the same result as in aluminum case alloy according to the present invention was confirmed.

Example 4

76 grams of aluminum, 11 g of silicon, 4.5 g of copper, 0.5 g of magnesium, 2.5 g of nickel, 0.5 g of chromium and 5 g of lead were mixed homogeneously by a mixer and the resulting mixture was molded under a pressure of 2 t/cm$^2$ to form a friction element. This molded friction element was sintered under hydrogen atmosphere at 580° C for about 30 minutes. This friction element was tested with respect to the coefficient of friction by means of an indoor tester. Namely, a wheel was driven by a railway wheel provided with a flywheel and to the wheel was pressed the friction element manufactured as described above and the friction element is slidden on the wheel surface and the wheel was rotated at a velocity of 40–160 Km/hr, while spraying water. In such a manner, the coefficient of friction was determined to obtain the result as shown in FIG. 6. As seen from FIG. 6, the coefficient of friction did not decrease to less than 0.15 even at the velocity of more than 150 Km/hr and the friction element showed an excellent frictional force. The worn amount was 5 mm per 10,000 Km of running distance and the bending strength was 3,500 Kg/cm$^2$.

FIG. 7 shows a relation between the coefficient of friction and the velocity measured by the above described tester when using the conventional friction element and from this figure it can be seen that the coefficient of friction is highly influenced by the variation of velocity and when the velocity becomes more than 50 Km/hr, the coefficient of friction ($\mu$) is less than 0.15. On the contrary, in the friction element of the present invention, the dependency to the velocity is very small as shown in FIG. 6 and even at a high speed, the coefficient of friction is more than 0.15 and the frictional force has been highly improved.

What is claimed is:

1. A friction element for coming forcedly into contact with at least a part of a rotary body for braking rotation thereof consisting of 50–85% by weight of Al, 0.1 – 10% by weight of Cu and 0.1 – 25 % by weight of Si.

2. The friction element of claim 1 wherein said element is used as a disc brake.

3. The friction element of claim 1 wherein said element is used as a brake shoe together with a conventional brake shoe.

4. A friction element for coming forcedly into contact with at least a part of a rotary body for braking rotation thereof consisting of 50 – 85% by weight of Al, 0.1 – 10% by weight of Cu, 0.1 to 25% by weight of Si, and less than 10% by weight of at least one of Mg, Ni, Cr, Fe, Pb and Bn.

5. The friction element of claim 4 wherein said element is used as a disc brake.

6. The friction element of claim 4 wherein said element is used as a brake shoe together with a conventional brake shoe.

7. A friction element for coming forcedly into contact with at least a part of a rotary body for braking rotation thereof and is a shaped article obtained by binding a mixture of at least 50% by weight of Al and the balance of asbestos, silica, alumina, iron oxide and sand with a thermosetting resin.

8. The friction element of claim 7 wherein said thermosetting resin is phenolic resin, furan resin, polyester resin or polydivinylbenzene resin.

9. The friction element of claim 7 wherein said element is used as a disc brake.

10. The friction element of claim 7 wherein said element is used as a brake shoe together with a conventional brake shoe.

* * * * *